United States Patent
Reichle et al.

(10) Patent No.: US 10,795,344 B2
(45) Date of Patent: Oct. 6, 2020

(54) METHOD FOR ASSIGNING COMPONENTS OF AN INDUSTRIAL PLANT TO A NAVIGATION TREE, METHOD FOR THE PARAMETERIZATION AND/OR START-UP OF COMPONENTS OF AN INDUSTRIAL PLANT, ASSIGNMENT APPARATUS AND PARAMETERIZATION AND/OR START-UP APPARATUS

(71) Applicant: SEW-EURODRIVE GMBH & CO. KG, Bruchsal (DE)

(72) Inventors: Robert Reichle, Stutensee (DE); Manfred Gaul, Kronau (DE); Daniel Reinhardt, Weil der Stadt (DE); Stephan Nicklis, Ober-Ramstadt (DE); Desiree Nissel, Oberhausen-Reinhausen (DE); Stephan Schneider, Bruchsal (DE); Rima Pfetzing, Bruchsal (DE); Anne Schilling, Karlsruhe (DE); Christian Hornung, Muggensturm (DE)

(73) Assignee: SEW-EURODRIVE GMBH & CO. KG (DE)

( * ) Notice: Subject to any disclaimer, the term of this patent is extended or adjusted under 35 U.S.C. 154(b) by 0 days.

(21) Appl. No.: 16/214,929

(22) Filed: Dec. 10, 2018

(65) Prior Publication Data
US 2019/0107828 A1    Apr. 11, 2019

Related U.S. Application Data

(63) Continuation of application No. 15/107,174, filed as application No. PCT/EP2014/003427 on Dec. 18, 2014, now Pat. No. 10,152,047.

(30) Foreign Application Priority Data

Dec. 23, 2013 (DE) .......... 10 2013 021 793
May 9, 2014 (DE) .......... 10 2014 006 699

(51) Int. Cl.
G05B 19/418    (2006.01)
G05B 17/02    (2006.01)
(Continued)

(52) U.S. Cl.
CPC ......... *G05B 19/4185* (2013.01); *G05B 17/02* (2013.01); *G06F 3/04842* (2013.01);
(Continued)

(58) Field of Classification Search
CPC . G05B 17/02; G05B 19/4185; G06F 3/04842; G06F 3/04845
See application file for complete search history.

(56) References Cited

U.S. PATENT DOCUMENTS 7,117,052 B2    10/2006  Lucas et al.
7,451,007 B2 *  11/2008  Bamberger ......... G06Q 10/067
                                              700/96
(Continued)

FOREIGN PATENT DOCUMENTS

DE   10 2006 003 125    7/2007
DE   10 2008 027 846    12/2009
(Continued)

OTHER PUBLICATIONS

International Search Report, dated Mar. 3, 2015, issued in corresponding International Application No. PCT/EP2014/003427.
(Continued)

*Primary Examiner* — Vincent H Tran
(74) *Attorney, Agent, or Firm* — Carter, DeLuca & Farrell LLP

(57) ABSTRACT

In an assignment apparatus, it is provided to generate a plant model for an industrial plant with the aid of a computer, components being represented by structural elements, and to allocate the structural elements to nodes of a navigation tree, in each case it being checked, with computer assistance,
(Continued)

whether the allocation matches structurally, in order to provide operative-control and/or output elements for the components in the navigation tree.

20 Claims, 2 Drawing Sheets

(51) Int. Cl.
G06Q 10/08 (2012.01)
G06Q 10/06 (2012.01)
G06F 3/0484 (2013.01)
G06F 3/0482 (2013.01)

(52) U.S. Cl.
CPC ....... *G06F 3/04845* (2013.01); *G06Q 10/063* (2013.01); *G06Q 10/0875* (2013.01); *G06F 3/0482* (2013.01); *Y02P 90/18* (2015.11)

(56) References Cited

U.S. PATENT DOCUMENTS

| 9,256,219 | B2* | 2/2016 | Blevins | G05B 19/0426 |
| 10,152,047 | B2* | 12/2018 | Reichle | G05B 17/02 |
| 2002/0107673 | A1 | 8/2002 | Haller | |
| 2003/0236576 | A1 | 12/2003 | Resnick et al. | |
| 2006/0206368 | A1 | 9/2006 | Bamberger | |
| 2009/0319062 | A1 | 12/2009 | Schwalbe | |
| 2010/0305721 | A1 | 12/2010 | Kostadiniov | |
| 2012/0182285 | A1 | 7/2012 | Faist et al. | |
| 2015/0149944 | A1 | 5/2015 | Fanzen | |

FOREIGN PATENT DOCUMENTS

| DE | 10 2011 008 941 | 7/2012 |
| DE | 10 2011 084 321 | 4/2013 |
| EP | 1 699 005 | 9/2006 |
| WO | 03/030466 | 4/2003 |

OTHER PUBLICATIONS

Prabhavalkar, et al., "Oracle Enterprise Service Bus—Developer's Guide", Sep. 1, 2006.
"Configuration Software Suite", DeltaV Product Data Sheet, published by Emerson Process Management, Jan. 2013.
International Preliminary Report on Patentability and Written Opinion, dated Jul. 13, 2016, issued in corresponding International Application No. PCT/EP2014/003427.

* cited by examiner

METHOD FOR ASSIGNING COMPONENTS OF AN INDUSTRIAL PLANT TO A NAVIGATION TREE, METHOD FOR THE PARAMETERIZATION AND/OR START-UP OF COMPONENTS OF AN INDUSTRIAL PLANT, ASSIGNMENT APPARATUS AND PARAMETERIZATION AND/OR START-UP APPARATUS

CROSS-REFERENCE TO RELATED APPLICATIONS

The present application is a continuation of U.S. patent application Ser. No. 15/107,174, filed on Jun. 22, 2016, which is the national stage entry of International Application No. PCT/EP2014/003427, filed on Dec. 18, 2014, which claims priority to German Patent Application Nos. 10 2013 021 793.8, filed on Dec. 23, 2013, and 10 2014 006 699.1 filed on May 9, 2014, each of which is incorporated herein in its entirety by reference thereto.

FIELD OF THE INVENTION

The present invention relates to a method for assigning components of an industrial plant to a navigation tree, a method for the parameterization and/or start-up of components of an industrial plant, an assignment apparatus and a parameterization and/or start-up apparatus

BACKGROUND INFORMATION

It is conventional to manage components of an industrial plant, e.g., with the aid of a master display.

SUMMARY

Example embodiments of the present invention simplify start-up and/or management of an industrial plant.

Among features of an example embodiment of the present invention of a method for assigning components of an industrial plant to a navigation tree—the navigation tree having nodes that are interlinked by directional links, the directional links defining an order structure which characterizes superordinate nodes and subordinate nodes for each node—are that in a first step, a structured plant model of the industrial plant is generated with computer assistance, the components of the industrial plant being assigned to structural elements of the plant model, and in a second step, at least one part of the plant model is selected and allocated to at least one target part of the navigation tree, and in a third step, with computer aid, it is checked whether the at least one selected allocated part of the plant model matches the at least one target part of the navigation tree, the allocation being rejected automatically if a result of the check is negative, and if the result of the check is positive, in a fourth step, the components assigned to the selected part of the plant model are linked in structure-correct fashion to nodes of the target part of the navigation tree, in order to map the selected part of the plant model in the at least one target part of the navigation tree. An advantage in so doing is that it permits automated or computer-aided filling of a navigation tree with component-specific data. Management of the plant is thus able to be simplified. At the same time, it is also considered advantageous that while assigning the components, a plausibility check is able to be carried out. False or incorrect assignments are therefore avoidable. The nodes are preferably linked to the components via the structural elements. Thus, the navigation tree reflects the plant structurally and/or functionally.

In this context, the industrial plant is, for example, a production plant, a purifying plant, a sorting plant, a conveying plant, a processing plant, or any other industrial plant using drive technology and/or having electronic measuring units, control units and/or regulating units.

Preferably, the quantity of components of the plant includes at least apparatuses such as drive units, gear units, electronic control units, converters, sensor units, actuating units and/or other apparatuses preferably controllable and/or able to be monitored electronically. Components are preferably apparatus parts of these apparatuses, e.g., control cards, electronic modules and/or mechanical, hydraulic, pneumatic and/or chemical modules. Alternatively, components are representable as apparatus groups which are formed, for example, by an interaction, by interrelated or identical functions, by one common installation site or by other associations of the apparatuses or apparatus parts included.

The components of the industrial plant may be internetworked. This is considered advantageous because networking of the components is useful to automatically ascertain information about a hierarchical organization or other structuring of the plant. Preferably, the plant model is generated by the automatic evaluation of responses to pollings to the components. For example, hierarchies are thus able to be reconstructed from the header and/or footer portions of the responses. This is considered advantageous because it permits a fully automatic generation of a plant model. At the same time, it is also considered advantageous that the plant model is able to be generated in fully automatic or at least semi-automatic fashion. A judgmental intervention by a user is therefore dispensable. The networking may be based on wireless connections and/or wire-bound connections.

In order to generate the plant model, in each case at least one data carrier may be read out at each component. For example, an RFID tag, a memory card, a storage module, a matrix marker or a bar code marker is usable as data carrier. An advantage in this case is that the components are able to be determined even when there is no networking. For instance, the matrix code marker is able to be formed as a QR code marker. This makes it possible to provide an electronic type label as text string, in which data delimiters are incorporated to separate the data fields. The user inputs the location and reads out the data necessary for the mapping in the plant model, from the data carrier. It is especially beneficial if the data carriers of the components are read out in a predefined sequence. This permits strictly structured acquisition processes when generating the plant model.

To link the components to the nodes of the navigation tree, at least one operative-control and/or output element for the component may be loaded into the node. This offers the advantage that the assigned information is usable over and above a mere representation of the plant model. Thus, after the assignment, a control of the plant according to the plant model is able to be set up fully automatically.

During or by the linking of the components to the nodes of the navigation tree, a control connection may be provided between the component and the node. An advantage in this case is that hardware conditions for the operation are able to be provided automatically at the same time. This shortens a time span until normal operation, especially the installation time for the plant. The control connection is able to be set up bidirectionally, for example, in order to permit transmitting and receiving.

After the at least one selected part of the plant model has been chosen, all parts of the navigation tree that are available for an allocation may be ascertained and marked automatically. An advantage is that the user is able to be guided. The period of time necessary for finding the correct part of the navigation tree is therefore reducible.

Prior to the check, a list of formable parts of the navigation tree may be generated automatically for the navigation tree. This offers the advantage that matching parts of the navigation tree are easily able to be ascertained and/or found automatically for a selected part of a plant model. Meanwhile, judgmental interventions by a user are dispensable. Preferably, the parts are interrelated parts. Especially preferred, the list is an ordered list. Thus, for a computer, the parts are easily discoverable in the list. For example, the list is ordered according to the number of nodes and/or links in the respective part. Preferably, the generated list is accessed for the already mentioned marking of available parts for an allocation.

To check whether the selected part of the plant model matches the target part of the navigation tree, at least one feature from the following group: total number of nodes, total number of links, number of links for each node, direction of the links, number of hierarchical levels and number of nodes in a hierarchical level of the selected part of the plant model, may be compared to the corresponding feature(s) of the target part of the navigation tree. Preferably, a plurality of features, e.g., two, three, four, five, more than five, more than ten or even more than one hundred features are compared. An advantage in this instance is that a part in the navigation tree matching a selected part in the plant model is ascertainable in computer-implemented fashion, e.g., automatically, based on easily processable criteria.

To check whether the selected part of the plant model matches the target part of the navigation tree, a functionality scope of at least one node of the selected part of the plant model may be compared to an operative-control and/or output structure of at least one node of the target part of the navigation tree. An advantage in so doing is that a differentiation of the components with the associated parts of the plant model is made possible on the basis of the particular intended function in the plant. For example, this is a number of axes assigned to the component, a type of mechanical movement and/or electrical control, a communication protocol used or a further property characterizing the method of operation.

Nodes of the navigation tree that are already linked to a component may be marked. This is considered advantageous because parts of the navigation tree which are already filled with data of the plant are displayable to the user. A further advantage is that double assignments are thus avoidable.

Among features of example embodiments of the present invention of a method for the parameterization and/or start-up of components of an industrial plant are that, in a method for assigning components of an industrial plant to a navigation tree, especially as described above and/or according to the following description of a method for assigning components of an industrial plant to a navigation tree, the components of an industrial plant are assigned to a navigation tree, that for at least one node of the navigation tree, at least one parameter value and/or at least one piece of start-up information is input or read out automatically from a database, and that the at least one parameter value and/or the at least one piece of start-up information is transmitted automatically via the link to the assigned component. This offers the advantage that an operator-control unit is able to be created fully automatically or with a high degree of automation. The use of routines proceeding automatically offers the advantage that large volumes of data are able to be processed in a short time. Preferably, the database is stored in a local storage device and/or at a remote location connected, for example, via the Internet.

Among features of example embodiments of the present invention with regard to an assignment apparatus for an industrial plant featuring components—having a storage device in which a navigation tree is stored, the navigation tree having nodes that are interlinked by directional links, the directional links defining an order structure which characterizes superordinate nodes and subordinate nodes for each node—are that a plant-model generating device is furnished for computer-aided generation of a structured plant model of the industrial plant, an assignment device being provided to assign the components of the industrial plant to structural elements of the plant model, that a selection device is adapted to select at least one part of the plant model, that an allocation device is furnished to allocate the selected part of the plant model to a target part of the navigation tree, that a checking device is arranged for a computer-aided check as to whether the selected part matches the target part, and that a linking device is provided which, in the event the selected part matches the target part, links the components of the selected part to nodes of the target part in structure-accurate manner. An advantage in this case is that a compact apparatus is obtained, with which the method for assigning, especially as previously described and/or according to the following description of an assignment apparatus, is able to be realized.

The plant-model generating device may be adapted to evaluate responses to pollings to the components. An advantage in this case is that dependencies, connections and hierarchical layouts of the components of the plant among each other are able to be ascertained automatically. To that end, for example, header packets, thus, data portions in the header of a response, or send protocols of the responses are evaluable automatically in order to determine a data flow. From the data flow, a hierarchy of the components is subsequently derivable, which preferably reflects functional and/or interconnection-related or connection-related dependencies of the components among each other.

The plant-model generating device may be adapted to read out data carriers located on the components. This is considered advantageous because it is possible to dispense with a manual input of parameters, operating variables, operating instructions and/or data concerning positioning within the plant, concerning mounting location and concerning function in the plant, as well as further data. Thus, the plant model is able to be created by a user reading out in succession the data carriers, which preferably are affixed to the components. Therefore, customary data formats are usable. In this context, the marker mentioned is imprinted, stuck on, cast in or in some other manner detachably or undetachably secured. The data carriers are preferably furnished as RFID tag, memory card, storage module, matrix-, bar-, 2D-, 3D-, or 1D-code marker or other carrier of a machine-readable code. It is especially beneficial if the plant-model generating device anticipates the read-out of the data carriers in a specific sequence and/or if the plant-model generating device in each case specifies, thus, for example, displays or in some other manner, e.g., acoustically, outputs the component for which a data carrier should be read out next. Alternatively or additionally, information about the assignment of the respective component may also be stored in the data carrier and read out from it. This simplifies the subsequent assignment of the read-out information to the particular intended component in the plant model.

The linking device may be adapted to load at least one operative-control and/or output element for the component into the associated node. This offers the advantage that the navigation tree is utilizable not only for display of a functional and/or physical structure of the plant, but in addition, is usable as a master display with operative-control function. A further advantage is that the navigation tree is convertible quickly and at short notice into a master display.

The linking device may be adapted to form a preferably bidirectional control connection between the component and the node. An advantage in this case is that data is able to be read out from the components and written into the components. For example, parameterizations, operating-state information, error messages, command confirmations, sensor measured values and sensor states, error logs, work logs and, in general, component-specific information are usable as readable data. Parameterizations, configurations, commands, messages or other operation-relevant and/or component-specific data, especially data changeable over time, are usable, for example, as writeable data. It is further advantageous that data is receivable from the components and assignable to the associated node in the navigation tree. Therefore, commands, parameters or other information about the nodes are transmittable to the associated components.

The assignment apparatus may be adapted to automatically ascertain and mark all parts of the navigation tree which are available for an allocation. This is considered advantageous because a user is able to be assisted in assigning the selected part to a target part of the navigation tree. Incorrect assignments are therefore avoidable. Thus, parts of the navigation tree for which no assignment or allocation has yet been made are able to be made visible.

The checking device may be equipped to automatically generate a list of formable parts of the navigation tree. An advantage in this case is that all parts, thus, e.g., subsets of nodes and links of the navigation tree which are selectable and/or possible as target part may be made available in a searchable list. For instance, a computer-aided ascertainment of matching target parts is therefore achievable or supportable. Preferably, the list is ordered. Consequently, a rapid search or filtering of matching target parts is possible. Preferably, the parts of the list in each case are interrelated. For example, this is characterizable in that each node of the part is connected to each other node of the part by at least one chain of links. Thus, the number of formable parts of the navigation tree is reducible. An advantage is that functional units are describable as interrelated parts. Therefore, a confinement to interrelated parts is sufficient for many practical applications. In this context, it is also advantageous that the parts of the plant model and/or of the navigation tree not yet assigned may be found more easily.

The checking device may be equipped to compare at least one feature from the following group: total number of nodes, total number of links, number of links for each node, direction of the links, number of hierarchical levels and number of nodes in a hierarchical level of the selected part of the plant model, to the corresponding feature(s) of the target part of the navigation tree. Preferably, the checking device is set up to compare a plurality of the features indicated, especially to compare two, three, more than three or all of these features. An advantage is that a computer-implementable comparison of parts of the navigation tree to parts of the plant model is possible, as, for example, the features are usable and/or used as attributes, and a functional and/or structural commonality of a part of the navigation tree with a part of the plant model is automatically recognizable and/or recognized when a predefined set of features match. A further advantage is that a group of features is made available, with which objects are able to be identified in computer-implemented fashion.

The checking device may be equipped to compare a functionality scope of at least one node of the selected part of the plant model to an operative-control and/or output structure of at least one node of the target part of the navigation tree. An advantage is that an additional or alternative comparison criterion is given. For instance, the functionality scope is the number of axes of a drive unit, the type and/or dimensioning of a positioning travel of an axis, a type of drive, a security level realized, a number of measuring parameters and/or adjusting parameters or other information describing a functionality or operating method of a component. Thus, a comparison based on the kind or type of components in question is made possible.

Nodes of the navigation tree that are already linked to a component may be marked. An advantage is that progress in the start-up of the plant by assignment of parts of the plant model to parts of the navigation tree is able to be displayed to the user. A further advantage is that double assignments of two or more parts of the plant model to one part of the navigation tree are avoidable. It is also advantageous that voids in the navigation tree, thus, parts to which no part of the plant model is yet assigned, are recognizable.

The assignment apparatus may be adapted to check whether further unassigned components and/or further nodes without linkage are available. If this is the case after the process has been completed, an error message is then able to be generated.

Among features of example embodiments of the present invention with respect to a parameterization and/or start-up apparatus for an industrial plant having components are that an assignment apparatus, especially as previously described and/or according to the following description of an assignment apparatus, is provided, that the components of an industrial plant are assigned to a navigation tree, and that an operative-control and/or output element is equipped to automatically transmit at least one parameter value input or read out from a database and/or at least one piece of start-up information input or read out from a database, for at least one node of the navigation tree, to the component linked to the node. This offers the advantage that a complete start-up is able to be carried out mostly or even completely in automated fashion. Thus, the assembly of a matching image of an industrial plant is supportable in computer-implemented fashion. The database is stored preferably in the storage device of the assignment apparatus and/or at a remote location connected, for example, via the Internet.

It is especially beneficial if the method for assignment is carried out with an assignment apparatus as described herein and/or if the assignment apparatus is adapted to perform a method for assignment as described herein.

Further features and aspects of example embodiments of the present invention are explained in greater detail with reference to the Figures.

DETAILED DESCRIPTION

Figure 1:
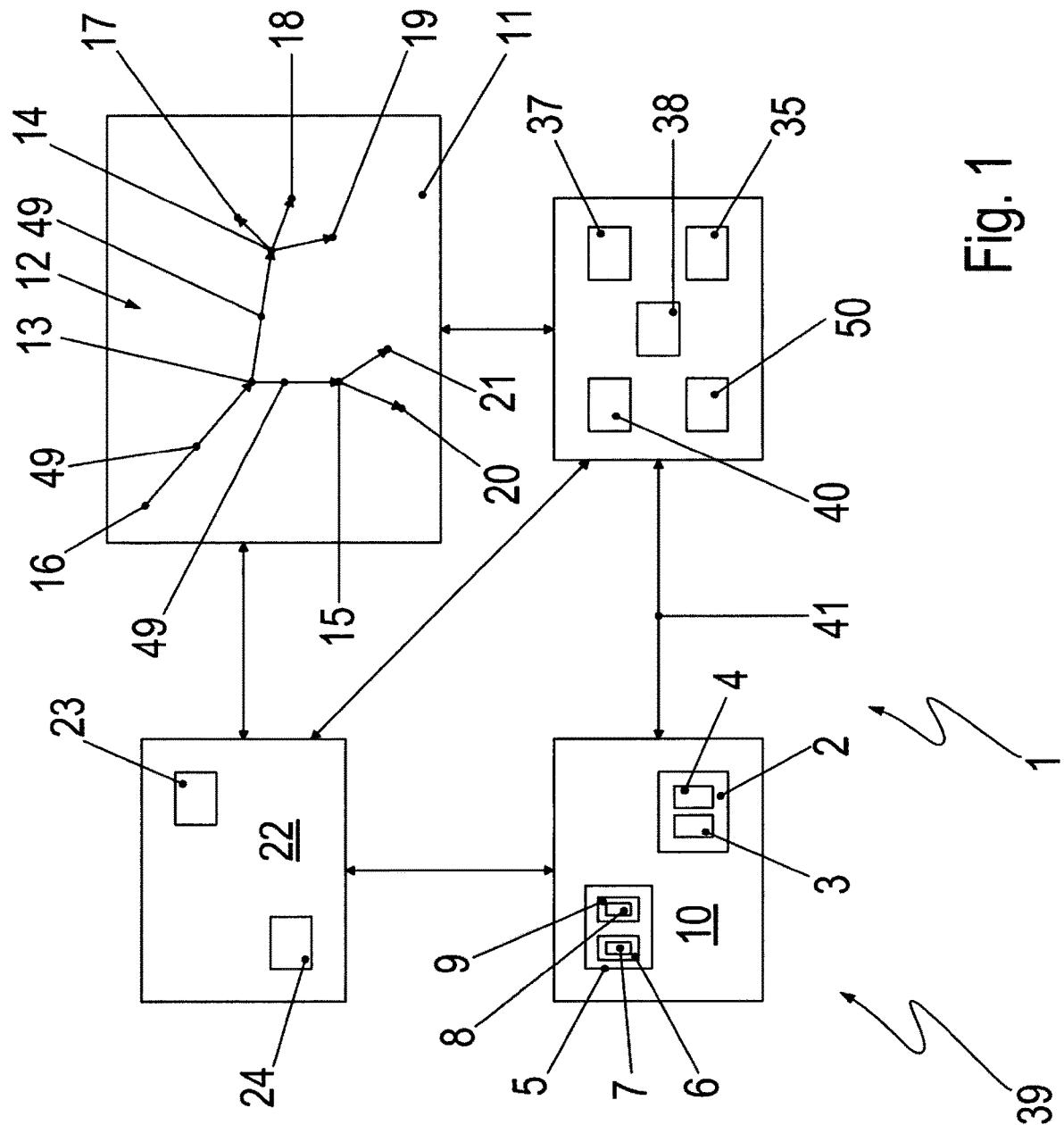
FIG. 1 shows a highly simplified schematic diagram of a parameterization and/or start-up apparatus according to an example embodiment of the present invention having an assignment apparatus according to an example embodiment of the present invention.
Figure 2:
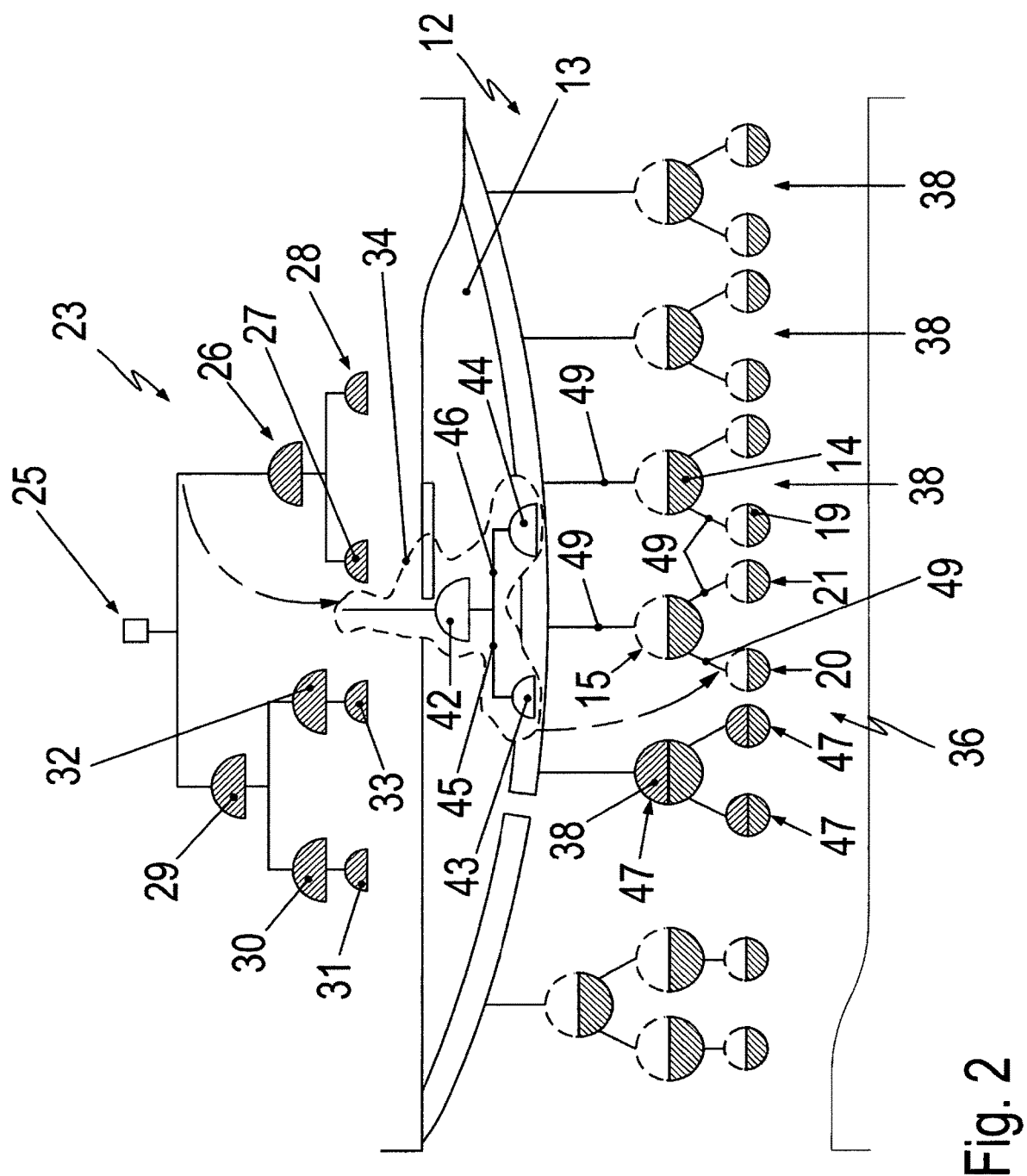
FIG. 2 shows in highly schematized fashion a method for assigning components of an industrial plant to a navigation tree according to an example embodiment of the present invention.

FIGS. 1 and 2 are described together hereinafter.

A parameterization and/or start-up apparatus, denoted in its entirety by 39 in FIG. 1, has an assignment apparatus 1, with which components. 2, 3, 4, 5, 6, 7, 8, 9 of a plant 10 are assignable to a navigation tree 12.

In this context, a navigation tree 12 is understood to be a hierarchical data structure that is displayable, at least in cutaway portions, by display device 1. For example, a hierarchy is able to be mapped by a direction of the links between the nodes.

Industrial plant 10, for example, is a production plant, a purifying plant, a sorting plant, a conveying plant, a processing plant, or any other industrial plant using drive technology and/or having electronic measuring units, control units and/or regulating units.

In this case, components 2, 3, 4, 5, 6, 7, 8, 9 are realizable as functional and/or structural units, groups or parts of industrial plant 10, e.g., the apparatus parts, apparatuses or apparatus groups relevant for a start-up and/or control.

Assignment apparatus 1 has a storage device 11 in which navigation tree 12 is stored.

Navigation tree 12 maps the structure of industrial plant 10, and to that end, is made up of a start node 16, one or more nodes 13, 14, 15 and one or more end nodes 17, 18, 19, 20, 21, which in each case are interlinked by directional links 49.

Thus, one node 13, 14, 15 or end node 17, 18, 19, 20, 21 of navigation tree 12 is assignable to each component 2, 3, 4, 5, 6, 7, 8, 9 of plant 10. Plant 10 itself is able to be mapped as start node 16.

The direction of links 49 defines an order structure, which characterizes subordinate and superordinate nodes, For example, node 13 is subordinate to start node 16 and superordinate to nodes 14 and 15, respectively.

Node 14 in turn is subordinate to node 13, and superordinate relative to end nodes 17, 18, 19, respectively.

A node 13 superordinate to another node 17 is thus located hierarchically between other node 17 and start node 13.

Start node 16 therefore represents a node to which no further node is superordinate. End nodes 17, 18, 19, 20, 21 in each case thus represent nodes to which no further node is subordinate. Start node 16 therefore represents the largest structural unit, and end nodes 17, 18, 19, 20, 21 represent the smallest structural units from which plant 10 is able to be assembled.

Navigation tree 12 is highly simplified for clarity; the number of nodes 13, 14, 15, 16, 17, 18, 19, 20, 21, both altogether and also in each case in a chain between the start node and an end node, as well as the number of links 49 branching off from a node 13, 14, 15, 16, 17, 18, 19, 20, 21 to subordinate nodes 13, 14, 15, 16, 17, 18, 19, 20, 21 is actually much greater in further exemplary embodiments. However, a characteristic of navigation tree 12 is that in each case only at the most one link 49 ends at each node 13, 14, 15, 16, 17, 18, 19, 20, 21, thus, that each node 13, 14, 15, 16, 17, 18, 19, 20, 21 has no more than one directly superordinate node. With the exception of start node 16, each node 13, 14, 15, 17, 18, 19, 20, 21 has exactly one superordinate node 13, 14, 15, 16

Assignment apparatus 1 also has a plant-model generating device 22, with which a structured plant model 23 of plant 10 is able to be created automatically with computer assistance.

To that end, components 2, 3, 4, 5, 6, 7, 8, 9 of industrial plant 10 are assigned to structural elements 25, 26, 27, 28, 29, 30, 31 (compare FIG. 2) of plant model 23. Assignment apparatus 1 has an assignment device 24 for this purpose. Concerning this, if desired, structural elements 25, 26, 27, 28, 29, 30, 31 are first created automatically in plant model 23, and subsequently filled in automatically with read-in data of components 2, 3, 4, 5, 6, 7, 8, 9.

The organization of structural elements 29, 30, 31, 32, 33 reflects the structure of components 5, 6, 7, 8, 9, while the organization of structural elements 26, 27, 28 represents the structure of components 2, 3, 4. Structural element 25 is reserved for entire plant 10.

For example, structural elements 31, 33, 27, 28 are shown as converters, while structural elements 30, 32, 26 are represented as interfaces of the converters. Structural element 29 in the example is superordinate hardware. The central server represents entire industrial plant 10, since all components 2, 3, 4, 5, 6, 7, 8, 9 depend directly or indirectly on this server and are subordinate to it. The server is therefore structural element 25 which connects the components named. In other examples, different structural elements are provided for different components.

Navigation tree 12 is shown only as an example, and in FIG. 1, does not reflect the structure of plant model 23.

Assignment apparatus 1 also has a selection device 50, which is equipped to select at least one part 34 (compare FIG. 2) of plant model 23. In this regard, for example, a combination of a computer mouse or similar pointing device with a display or another indicating device is possible, like, e.g., a tablet computer or a smart phone or a touchscreen.

FIG. 2 shows the choosing of a selected part 34 of plant model 34 by drag-and-drop.

With the aid of an allocation device 35, the user allocates this selected part 34 to a target part 36 of navigation tree 12. Allocation device 35 here is identical to selection device 50.

During drag-and-drop, the selected part is chosen or clicked on with the aid of selection device 50, dragged to target part 36 and released or dropped there.

Aided by computer, a checking device 37 checks whether selected part 34 matches target part 36. In the example, the number of nodes 15, 20, 21 of target part 36 agrees with the number of structural elements 42, 43, 44, just like the number and configuration of links 49 of target part 36 agrees with the number and configuration of connections 45, 46 between the structural elements of selected part 34. Checking device 37 determines the agreement automatically and therefore enables the allocation or rather confirms it. In addition, checking device 36 compares the functionality scope of structural elements 42, 43, 44 to the operative-control and/or output structure of nodes 15, 20, 21.

On the other hand, if checking device 37 discovers a discrepancy between selected part 34 and target part 36, the allocation is rejected and the user must select a new part of navigation tree 12 as target part 36.

In this case, the drop on target part 36 is prevented, and selected part 34 jumps from navigation tree 12 back into plant model 23.

After confirmation or acceptance of the allocation, a linking device 40 automatically links components 2, 3, 4 to nodes 15, 20, 21 of target part 36. Thus, component 3, e.g., a converter, which is assigned to structural element 43, is linked to end node 20, component 4, likewise a converter, is linked via structural element 44 to end node 21, and component 2, e.g., an interface used jointly by the converters, is linked to superordinate node 15. Connection 44 is linked to link 49 between nodes 15 and 20, and connection 46 is linked to link 49 between nodes 15 and 21. Therefore, selected part 34 of plant model 23 is mapped structurally correctly in navigation tree 12.

In FIG. 2 to the left of target part 36, filled nodes 47 are shown, which were already linked to a component 2, 3, 4, 5, 6, 7, 8, 9 in previous steps. These nodes 47 are marked as already linked by full circles.

In FIG. 2 to the right of target part 36, further parts 48 of navigation tree 12 are shown, which could likewise be possible structurally for an allocation. For example, parts 36, 48 each represent a carriage with lifting platform, each of which has one of the converters mentioned as component for traveling and for lifting. Therefore, this carriage has at least two axes of mobility, at least one axis for track-guided travel, for instance, and one axis for the lifting of the lifting platform.

Checking device 37 has previously generated a list of formable parts of navigation tree 12, in which parts 36, 38 are entered. This list is ordered in terms of the features mentioned, so that checking device 37 recognizes further parts 48 as potential target parts 36. Therefore these further parts 48 are marked and displayed as potential target parts 36 available for an allocation. The user selects target part 36 from among these marked parts.

After the user has completed the process, assignment apparatus 1 checks automatically whether further unassigned components 2, 3, 4, 5, 6, 7, 8, 9 and/or further nodes 13, 14, 15, 16, 17, 18, 19, 20, 21, 47 without linkage are available. If this is the case, then an error message is generated or the user is prompted to continue the process.

Plant-model generating device 22 uses a networking, which may be conventional and is not further shown, of components 2, 3, 4, 5, 6, 7, 8, 9 in plant 10, e.g., for the exchange of data and/or for the energy supply, in order to generate plant model 23 automatically. To that end, plant-model generating device 22 transmits pollings to components 2, 3, 4, 5, 6, 7, 8, 9, to which components 2, 3, 4, 5, 6, 7, 8, 9 respond. The responses are evaluated in plant-model generating device 22. From the send protocols and/or header packets (header lines) of the responses sent, plant-model generating device 22, in accordance with rules stored in storage device 11 or a further storage device, draws conclusions about a structure which is imaged in plant model 23.

Alternatively, components 2, 3, 4, 5, 6, 7, 8, 9 may be provided with data carriers, whose content a user reads into plant-model generating device 22. For example, these data carriers may be realized as QR codes, in which data of an electronic type label is held ready as text string, the individual data fields in the text string being separated from each other by data delimiters.

In storage device 11 or in another storage device, operative-control and/or output elements 38 are stored, which are furnished for the operative control of components 2, 3, 4, 5, 6, 7, 8, 9 and/or for the output of component-specific or general information.

As a sub-step of the linking of selected part 34 to target part 36 already mentioned, linking device 40 loads respective associated operative-control and/or output element 38 into the particular intended node, resulting in the filled-in full-circle representation of filled nodes 47.

Finally, linking device 40 sets up a bidirectional control connection 41 between filled node 47, especially operative-control and/or output element 38, and associated component 2, 3, 4, 5, 6, 7, 8, 9. The respective component is therefore controllable and readable via operative-control and/or output element 38.

Via control connection 41, start-up information is read out from a database stored in control device 11, and written into respective component 2, 3, 4, 5, 6, 7, 8, 9. Thus, a start-up or later parameterization of components 2, 3, 4, 5, 6, 7, 8, 9 of industrial plant 10 is carried out.

In the case of an assignment apparatus 1, it is proposed, with computer assistance, to generate a plant model 23 for an industrial plant 10, components 2, 3, 4, 5, 6, 7, 8, 9 being represented by structural elements 25, 26, 27, 28, 29, 30, 31, 42, 43, 44, and to allocate structural elements 25, 26, 27, 28, 29, 30, 31, 42, 43, 44 to nodes 13, 14, 15, 16, 17, 18, 19, 20, 21 of a navigation tree 12, in each case it being checked, with computer aid, whether the allocation matches structurally, in order to provide operative-control and/or output elements 38 for components 2, 3, 4, 5, 6, 7, 8, 9 in navigation tree 12.

LIST OF REFERENCE NUMERALS 1 assignment apparatus
2, 3, 4, 5, 6, 7, 8, 9 components
10 plant
11 storage device
12 navigation tree
13, 14, 15 nodes
16 start node
17, 18, 19, 20, 21 end nodes
22 plant-model generating device
23 plant model
24 assignment device
25, 26, 27, 28, 29 structural element
30, 31, 32, 33 structural element
34 selected part
35 allocation device
36 target part
37 checking device
38 operative-control and/or output element
39 parameterization and/or start-up apparatus
40 linking device
41 control connection
42, 43, 44 structural element
45, 46 connection
47 filled node
48 further part
49 link
50 selection device

What is claimed is:

1. A method for assigning components of an industrial plant to a navigation tree, the navigation tree having nodes that are interlinked by directional links, the directional links defining an order structure that includes a single start node, at least one intermediate node, and a plurality of end nodes, each end node and each intermediate node having a single directly superordinate node, the start node having only subordinate nodes, comprising:

generating a structured plant model of the industrial plant with computer assistance, the components of the industrial plant being assigned to structural elements of the plant model;

selecting at least one part of the plant model and allocating the at least one selected part to at least one target part of the navigation tree;

checking, with computer aid, whether the at least one selected allocated part of the plant model matches the at least one target part of the navigation tree, the allocation being rejected automatically if a result of the check is negative; and if the result of the check is positive, linking the components assigned to the selected part of the plant model in structure-correct fashion to nodes of the target part of the navigation tree, in order to map the selected part of the plant model in the at least one target part of the navigation tree.

2. The method according to claim 1, wherein the components of the industrial plant are inter-networked, the plant model being generated by automatic evaluation of responses to pollings to the components.

3. The method according to claim 1, wherein in order to generate the plant model, in each case at least one data carrier is read out, in a predetermined sequence, at each component, the at least one data carrier including an RFID tag, a memory card, a storage module, a matrix marker, barcode marker and/or a 2D-, 3D-, or 1D-code marker.

4. The method according to claim 1, wherein in order to link the components to the nodes of the navigation tree, at least one operative-control and/or output element for the component is loaded into the node.

5. The method according to claim 1, wherein during or by the linking of the components to the nodes of the navigation tree, a bidirectional control connection is provided between the component and the node.

6. The method according to claim 1, wherein after the at least one selected part of the plant model is chosen, all parts of the navigation tree that are available for an allocation are ascertained and marked automatically.

7. The method according to claim 1, wherein prior to the check, an ordered list of formable, interrelated parts of the navigation tree being generated automatically for the navigation tree.

8. The method according to claim 1, wherein to check whether the selected part of the plant model matches the target part of the navigation tree, a total number of nodes of the selected part of the plant model is compared to a corresponding feature of the target part of the navigation tree.

9. The method according to claim 1, wherein to check whether the selected part of the plant model matches the target part of the navigation tree, a total number of links of the selected part of the plant model is compared to a corresponding feature of the target part of the navigation tree.

10. The method according to claim 1, wherein to check whether the selected part of the plant model matches the target part of the navigation tree, a number of links for each node of the selected part of the plant model is compared to a corresponding feature of the target part of the navigation tree.

11. The method according to claim 1, wherein to check whether the selected part of the plant model matches the target part of the navigation tree, a direction of the links of the selected part of the plant model is compared to a corresponding feature of the target part of the navigation tree.

12. The method according to claim 1, wherein to check whether the selected part of the plant model matches the target part of the navigation tree, a number of hierarchical levels of the selected part of the plant model is compared to a corresponding feature of the target part of the navigation tree.

13. The method according to claim 1, wherein to check whether the selected part of the plant model matches the target part of the navigation tree, a number of nodes in a hierarchical level of the selected part of the plant model is compared to a corresponding feature of the target part of the navigation tree.

14. The method according to claim 1, wherein to check whether the selected part of the plant model matches the target part of the navigation tree, (a) a total number of nodes, (b) a total number of links, (c) a number of links for each node, (d) a direction of the links, (e) a number of hierarchical levels, and/or (f) a number of nodes in a hierarchical level of the selected part of the plant model is compared to a corresponding feature of the target part of the navigation tree.

15. The method according to claim 1, wherein to check whether the selected part of the plant model matches the target part of the navigation tree, a functionality scope of at least one node of the selected part of the plant model is compared to an operative-control and/or output structure of at least one node of the target part of the navigation tree.

16. A method for parameterization and/or start-up of components of an industrial plant, comprising:

in the method as recited in claim 15, the components of an industrial plant are assigned to a navigation tree, for at least one node of the navigation tree, at least one parameter value and/or at least one piece of start-up information is input or read out automatically from a database, and the at least one parameter value and/or the at least one piece of start-up information is transmitted automatically via the link to the assigned component.

17. The method according to claim 1, wherein nodes of the navigation tree that are already linked to a component are marked.

18. The method according to claim 1, wherein an automatic check is performed to determine whether further unassigned components and/or further nodes without linkage are available.

19. An assignment apparatus for an industrial plant having components, comprising:

a storage device adapted to store a navigation tree, the navigation tree having nodes that are interlinked by directional links, the directional links defining an order structure that includes a single start node, at least one intermediate node, and a plurality of end nodes, each end node and each intermediate node having a single directly superordinate node, the start node having only subordinate nodes;

a plant-model generation device adapted for computer-aided generation of a structured plant model of the industrial plant;

an assignment device adapted to assign the components of the industrial plant to structural elements of the plant model;

a selection device adapted to select at least one part of the plant model;

an allocation device adapted to allocate the selected part of the plant model to a target part of the navigation tree;

a checking device adapted for a computer-aided check as to whether the selected part matches the target part; and a linking device adapted to link, in the event that the selected part matches the target part, the components of the selected part to nodes of the target part in structure-accurate manner.

20. A parameterization and/or start-up apparatus for an industrial plant including components, comprising:
an assignment apparatus as recited in claim 19, the components of an industrial plant being assigned to a navigation tree; and
an operative-control and/or output device adapted to automatically transmit at least one parameter value input or read out from a database and/or at least one piece of start-up information input or read out from a database with respect to at least one node of the navigation tree, to the component linked to the node.

* * * * *